March 30, 1954    H. N. FAWCETT    2,673,559
ELECTROCARDIOGRAPH
Filed Feb. 25, 1950
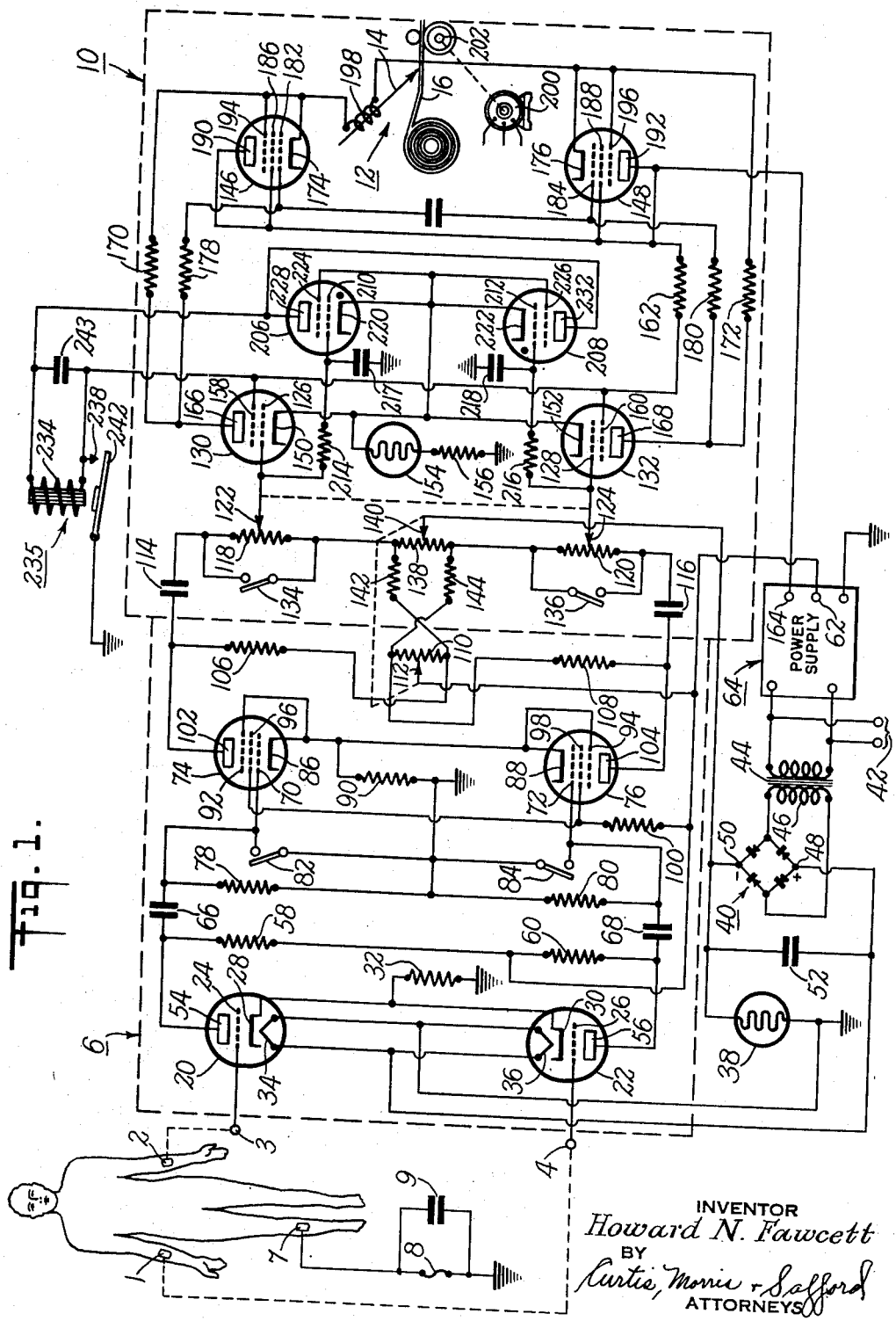
INVENTOR
Howard N. Fawcett
BY
Curtis, Morris & Safford
ATTORNEYS Patented Mar. 30, 1954

2,673,559

UNITED STATES PATENT OFFICE 2,673,559

ELECTROCARDIOGRAPH

Howard N. Fawcett, Briarcliff Manor, N. Y., assignor to Cambridge Instrument Company, Inc., New York, N. Y., a corporation of New York Application February 25, 1950, Serial No. 147,465

13 Claims. (Cl. 128—2.06)

This invention relates to electrical recording apparatus and to electronic circuits for use in such recording apparatus, particularly in electrocardiographs and the like.

Apparatus of this type is used for plotting voltages generated by the human body in order to detect and study certain physiological conditions. Photographic systems, for example employing a string galvanometer, are often used to obtain such plots. Such systems provide a very accurate record, but because of the photographic nature of the process, they require light sensitive paper with special precautions to protect it from exposure to any light except that which makes the record. Moreover, the record after exposure must be developed chemically, as with other photographic prints, so that the results of a particular electrocardiographic examination are not immediately available. It is therefore desirable to provide direct-recording cardiographic apparatus in which the minute voltages, picked up by electrodes appropriately placed on the body, are amplified electronically and used to drive a moving-stylus recorder. Such arrangements have many advantages over the more usual photographic systems, but are not intended to replace them, but rather to provide a valuable supplement to be used in conjunction with the more precise electrocardiographs. For example, a preliminary electrocardiographic record is often desired when it is not possible or convenient to make a photographic record. It is often desirable to observe the electrocardiogram either as it is being traced or immediately thereafter. To meet the need for such portable and direct-recording electrocardiographs, one may sacrifice some of the ultimate precision of the string galvanometer-photographic record type electrocardiograph, leaving the study of the finest detail until a photographic record can be made; but the record drawn by a stylus or other direct recorder must be as accurate as it is possible to make it.

If the portable electrocardiograph is to meet even the minimum requirements, the amplifier and recorder must be capable of responding faithfully over a wide frequency range, and power dissipation in the apparatus must be kept at such a low level that the equipment, although housed in a case small enough to be carried conveniently, will not have an excessive temperature rise during operation. Moreover, in portable apparatus, it is not usually practical to include a source of power within the instrument, and the electrocardiograph must be capable of satisfactory operation from ordinary power mains where the supply voltage may be subject to considerable fluctuation.

In accordance with the present invention, highly efficient and stable electronic circuits, which provide sufficient power to drive a stylus-type recorder without dissipating an excessive amount of power or sacrificing high recording fidelity, are embodied in a compact, portable, direct-recording electrocardiograph. The various features of the invention relate to an overload circuit which automatically protects the recording mechanism from damage while protecting against recording distorted and misleading wave forms, centering, adjusting and stabilizing circuits, arrangements for minimizing changes in the operating characteristics with changes in supply voltage, and circuits for preventing harm to the patient in the event of electrical failure of any of the components. Other aspects of the invention relate to means for adjusting the electronic circuits, to apparatus for increasing their stability, and to means for avoiding undesirable effects of transient voltages. Other aspects, advantages, and objects will be apparent from the following description considered in conjunction with the accompanying drawing which shows, diagrammatically, an amplifier and recorder system embodying the invention.

The voltages developed by the patient are picked up by a conventional arrangement of contact electrodes, indicated diagrammatically at 1 and 2, which are connected through switching or other auxiliary circuits (not shown) to two input terminals 3 and 4 of a two-stage, push-pull amplifier, generally indicated at 6.

The right leg of the patient is ordinarily connected to ground to complete the input circuit. As shown in the drawing, an electrode 7, in contact with the right leg of the patient, is connected to ground through a fuse 8, which has very low current-carrying capacity and is provided as a safety precaution to prevent the possibility of injury to the patient in the event of failure of some high voltage component in the apparatus. However, such a fuse will be blown sometimes at the instant the apparatus is turned on even though the current which blows the fuse is of such short duration that no harmful effect or physical discomfort is experienced by the patient. Whether a sufficient transient voltage is induced to blow the fuse when the apparatus is turned on depends upon the condition of the apparatus and the portion of the A.-C. wave form which is being traversed by the supply voltage at the instant the starting switch is closed. In order to prevent these harmless instantaneous discharges from blowing the fuse 8, a small fixed condenser 9 is connected in parallel with the fuse. This condenser prevents the accidental blowing of the fuse when the apparatus is switched on, but does not interfere with the normal protection provided by the fuse. The amplified signal voltages control the balance of a vacuum-tube bridge circuit, generally indicated at 10 at the right-hand part of the drawing, which drives a stylus-type recording mechanism, generally indicated at 12. When the bridge circuit 10 is unbalanced by the application of patient voltages to the terminals 3 and 4, the bridge circuit causes lateral deflection of a recording stylus 14 which is arranged to mark on a moving strip of chart paper 16.

In the amplifier portion 6, two vacuum tubes 20 and 22 are arranged for push-pull operation, and the input terminals 3 and 4 are connected to the control grids 24 and 26 of the input tubes 20 and 22, respectively. The cathodes 28 and 30 of these tubes are connected together and returned to ground through a common bias resistor 32.

In order to minimize the effects of changes in supply voltage, the heaters 34 and 36 of tubes 20 and 22, respectively, are supplied with current through a constant current ballast tube 38. These heaters are connected in parallel with one of their terminals connected to ground; the other terminal is connected to the positive side of a conventional full-wave bridge rectifier circuit 40. Power for the heaters is obtained from power mains 42 through a transformer 44, the secondary winding 46 of which is connected to the input terminals of bridge 40. The direct current from the bridge rectifier 40 flows from output terminal 48 through the heaters 34 and 36, in parallel, and through the constant current ballast tube 38 to the opposite rectifier terminal 50. A condenser 52 is connected between terminals 48 and 50 to smooth the pulsating direct current delivered by the bridge rectifier 40. If the supply voltage on mains 42 varies, the resistance of ballast tube 38 changes in such direction as to minimize the change in current through the heaters 34 and 36. The heaters of the remaining tubes may be connected to a suitable alternating current source in the conventional manner; neither the heaters nor their supply circuits are shown in the drawing.

The anodes 54 and 56 of the tubes 20 and 22 are connected, respectively, through two plate load resistors 58 and 60 to a positive terminal 62 of a conventional rectifier-filter power supply, indicated in block form at 64, which also derives its power from alternating current supply mains 42. The signal voltages appearing at these anodes are coupled through two coupling condensers 66 and 68 to control grids 70 and 72, respectively, of two push-pull, voltage-amplifying tubes 74 and 76. Grid return circuits are provided by resistors 78 and 80 which are connected between grids 70 and 72, respectively, and ground. Two switches 82 and 84 are connected so that the grids 70 and 72 can be shorted to ground during adjustment of the equipment, as will be explained later. The cathodes 86 and 88 of these tubes are connected to ground through a common biasing resistor 90. The suppressor grids 92 and 94 of these tubes are connected to their respective cathode circuits, and the screen grids 96 and 98 are connected together and through a voltage-dropping resistor 100 to the positive terminal 62 of the power supply 64. Positive voltage is provided for the anodes 102 and 104 of these tubes through plate-load resistors 106 and 108, respectively, which are connected to opposite ends of a potentiometer 110, which has an adjustable contact 112 that is connected to positive terminal 62 of the power supply 64.

The signals appearing at anodes 102 and 104 are coupled, respectively, through two coupling condensers 114 and 116 to sensitivity control potentiometers 118 and 120, the adjustable contacts 122 and 124 of which are connected, respectively, to control grids 126 and 128 of bridge-amplifier tubes 130 and 132. Two switches 134 and 136 are connected in parallel with the potentiometers 118 and 120, respectively; their purpose will be set forth later.

The adjustable contacts 122 and 124 of the potentiometers 118 and 120 are ganged together mechanically in order to provide a single control for adjusting the sensitivity of the amplifier system. This control arrangement is such that the magnitudes of the signals applied to the two grids 126 and 128, increase or decrease in unison. The other ends of potentiometers 118 and 120 are connected, respectively, to opposite ends of a potentiometer 138, the adjustable contact 140 of which is connected to the negative bridge-rectifier terminal 50. The ends of the potentiometer 138 are connected, respectively, through the resistors 142 and 144 to opposite ends of the potentiometer 110.

The potentiometers 110 and 138 control the lateral position of the recording stylus 14 when no signal is applied to the amplifier 6. The adjustable contacts 112 and 140 of potentiometers 110 and 138 are ganged mechanically, so that by manual adjustment of a single control, the values of these amplified signals, with respect to ground, can be balanced or controlled so that the wave form traced by the stylus 14 will appear as desired with respect to the longitudinal center of the chart paper. Adjustment of these potentiometers varies the bias voltages of bridge-amplifier tubes 130 and 132 simultaneously in opposite directions, thus regulating the relative currents through these tubes to secure the desired balance condition of the output bridge circuit 10, which controls the recording mechanism 12.

The amplifier portion of an electrocardiograph must be capable of amplifying very low frequencies in order that the patient voltages will be faithfully recorded. For this reason the coupling condensers, such as 114 and 116, must have large values, for example, of the order of two microfarads. With such large capacities and the relatively high resistances necessary to give the desired long time-constants, bias changes caused by adjustment of the potentiometer 138 would not be fully effective until the coupling condensers 114 and 116 became stabilized at the new voltages, and because these vias voltages affect the lateral position of the recording stylus 14, its movement would be sluggish during adjustment and it would continue to drift after the adjustment.

In order to overcome this tendency to drift, and make the response substantially instantaneous, the voltage on the anode 102 of the preceding tube 74 is shifted in the same direction, and by the same amount, as is the voltage on the grid 126 of the bridge-amplifier tube 130, while the voltage on the anode 104 of tube 76 is simultaneously shifted in the same direction and amount as is the voltage applied to the grid 128 of the tube 132. The potential on the coupling condensers 114 and 116 will then remain constant for all settings, and no delay will be introduced because of charging or discharging time for these condensers.

In considering the operation of this stabilizing circuit, it may be noted that control grids 126 and 128 of the tubes 130 and 132 are connected through the potentiometer 110 to the positive supply terminal 62 of the power supply 64, and through the potentiometer 138 to the negative terminal 50 of the bridge rectifier 40. Assuming that the positioning control is adjusted so that the potentiometer taps 112 and 140 move upwardly, as viewed in the drawing, it will be seen that the potentiometer 110 will supply a smaller component of positive voltage to the grid 126 and the potentiometer 138 will supply a larger component of negative voltage to this grid, and the grid 126 accordingly will become more negative. At the same time the voltage on the anode 102 of the tube 74 will become less positive, that is, change in a negative direction, by the same amount as the voltage on the grid 126, and the potential difference between the plates of the coupling condenser 114 will remain constant. This same movement of the positioning control will cause the voltages applied to the anode 104 of the tube 76, and the grid 128 of tube 132, to become increasingly positive by like amounts. Accordingly, the initial or rest position of the recording stylus 14 can be adjusted rapidly and accurately by manual adjustment of a single control member. Moreover, the arrangement permits adjustment of the sensitivity without affecting the centering adjustment.

The two bridge-amplifier tubes 130 and 132 are arranged, in conjunction with two auxiliary bridge tubes 146 and 148, to form the bridge network that drives the recorder 12. The cathodes 150 and 152 of the bridge-amplifier tubes 130 and 132 are connected together and to ground through a constant current ballast tube 154 in series with a fixed resistor 156. This ballast tube stabilizes the operation of the circuit against changes that would be caused by line voltage fluctuations, and will be discussed more fully below. The screen grids 158 and 160 of these tubes are connected together and through a voltage dropping resistor 162 to a second terminal 164 of the power supply 64, which is arranged to deliver a higher positive voltage to the terminal 164 than to the terminal 62.

The anodes 166 and 168, of these tubes, are connected through the load resistors 170 and 172 to cathodes 174 and 176 of the two auxiliary bridge tubes 146 and 148, respectively, and also through two isolating resistors 178 and 180 to control grids 182 and 184 of the tubes 146 and 148, respectively.

The screen grids 186 and 188 of the tubes 146 and 148 are connected to the anodes 190 and 192, which are connected together and to the positive supply terminal 164. The suppressor grids 194 and 196 are connected to the cathode circuits of the respective tubes. A galvanometer coil 198 of the recording galvanometer 12 is connected between the cathodes 174 and 176 of the auxiliary tubes 146 and 148, and is arranged to deflect the recording stylus 14 in accordance with the direction and magnitude of the current through it.

With this arrangement the tubes 130 and 146 are effectively connected in series to form one branch of the bridge circuit 10, and the tubes 132 and 148 are effectively connected in series to form the other branch of the bridge circuit. So long as the bridge amplifier tubes 130 and 132 carry equal currents, and the two auxiliary tubes 146 and 148 are carrying equal currents, no voltage will appear between the cathodes 174 and 176 of the tubes 146 and 148, and no current will flow through the galvanometer coil 198. However, if the control grid, say, of the first bridge amplifier tube 130, becomes more positive, the plate current flowing through this tube increases, increasing the voltage drop across resistor 170 and causing an increased negative voltage on the control grid 182 of the auxiliary tube 146 with respect to its cathode 174. This increase in negative bias increases the effective plate impedance of tube 146 and reduces the flow of current through that tube. However, as the grid 126 of the tube 130 becomes more positive, the grid 128 of the other bridge amplifier tube 132 becomes more negative by a corresponding amount, and accordingly the plate current of the latter tube is decreased, thus reducing the voltage drop across the load resistor 172, and driving the grid 184 of the auxiliary tube 148 in a positive direction to reduce the effective plate impedance of the latter tube. It is now seen that the effect of a signal having the above polarity is to reduce the plate impedances of tubes 130 and 148 and to increase the plate impedances of tubes 132 and 146. Thus, the principal current flow can be traced from power supply terminal 164 to the anode 192 of the tube 148, through it to the cathode 176, through the galvanometer coil 198 of recorder 12, through the load resistor 170 to the anode 166 of tube 130, to its cathode 150, and through the ballast tube 154 and resistor 156 to ground. When the polarity of the applied signal is reversed, the impedance of the tubes 132 and 146 is decreased and the impedance of the tubes 130 and 148 is increased correspondingly, so that current flows through coil 198 in the opposite direction.

The input signal controls only the bridge amplifier tubes 130 and 132, which in turn, respectively, control the auxiliary tubes 146 and 148. Thus, the impedances of all four arms of the bridge arrangement are simultaneously controlled, providing maximum efficiency and maximum variation in current through the galvanometer coil 198 with minimum energy dissipation in the circuit. That is, a given change in input signal simultaneously changes the impedance of all four arms of the bridge, thus producing a greater unbalance signal than with a conventional bridge arrangement. Because the impedance of opposite arms of the bridge are simultaneously decreased upon receiving a signal, greater current flow through the galvanometer coil 198 is produced with a given applied voltage, so that a greater proportion of the expended energy is utilized by the galvanometer than in the conventional bridge arrangement. This arrangement provides its greatest advantages when the bridge circuit drives a current-operated device, such as the recording galvanometer 12.

In order that the deflection produced by the current through the galvanometer coil 198 can be recorded as a function of time, an electric motor 200 is provided for driving a roller 202 that pulls the chart paper or tape 16 past the recording stylus 14 at a uniform speed.

If a signal much greater than those anticipated when the gain control of the amplifier is adjusted, is applied accidentally to the input circuit, the current passing through the galvanometer coil 198 may be such as to damage the coil or other parts of the recording apparatus. If this is prevented merely by limiting the maximum signal, false conclusions may be drawn from examination of the resulting plot. Accordingly, means are included for rendering the galvanometer deflecting circuit inoperative under such conditions.

Two gaseous-discharge overload control tubes 206 and 208 are arranged with their anode circuits in parallel and their control grids 210 and 212, respectively, coupled through two resistors 214 and 216 to the control electrodes 126 and 128 of the bridge-amplifier tubes 130 and 132. Resistors 214 and 216, in conjunction with condensers 217 and 218, which are connected from grids 210 and 212, respectively, to ground, prevent transient peaks, which are of such short duration that they would not harm the recording mechanism, from igniting the gaseous overload control tubes. The cathodes 220 and 222 and the secondary control grids 224 and 226 of the two gas tubes 206 and 208 are connected directly to the cathodes 150 and 152 of tubes 130 and 132. The anodes 228 and 232 of tubes 206 and 208 are connected together and through an actuating coil 234 of a relay 235 to the screen grids 158 and 160 of the bridge-amplifier tubes 130 and 132. Thus, the screen current for tubes 130 and 132 and the plate current of tubes 206 and 208 are derived from the power supply 64 through a common series resistor 162.

The overload control tubes 206 and 208 are normally non-conductive, because of bias voltage supplied from power supply terminal 50 through potentiometers 118 and 120, until the voltage applied to the control grid of either gaseous discharge tube reaches a predetermined potential, that is, becomes less negative with respect to its associated cathode, at which point the tube ignites. When either of the gas tubes 206 or 208 is thus ignited the relatively large flow of plate current causes a large voltage drop across the resistor 162 so that the screen grids 158 and 160 of the bridge amplifier tubes 130 and 132 are instantly reduced, thus substantially cutting off the flow of plate current in these tubes and preventing the flow of appreciable current through the galvanometer coil 198. The current through the ignited gas tube 206 or 208 also flows through the actuating coil 234 of relay 235 and closes the relay contacts 238 and 242. When these contacts close, they connect the anodes of the gaseous discharge tubes 206 and 208 to ground, thereby de-energizing these tubes. A condenser 243 is connected in parallel with the relay actuating coil 234 and prevents the relay from acting instantaneously. Alternatively, the condenser 243 may be omitted and a relay of the slow-closing or slow-release type, substituted.

Thus, if a momentary overload signal is applied to the bridge-amplifier tubes, one or the other of the overload tubes 206 and 208 is rendered conductive, depending upon the polarity of the signal, and removes the screen voltage from the bridge amplifier tubes 130 and 132, and the relay closes to extinguish the gaseous tubes 206 and 208. After a short time, depending upon the capacity of condenser 243 (or the delay characteristics of the relay 235), the relay contacts will open to re-energize the bridge circuit. If the overload signal is still present, the cycle will be repeated until the overload signal is no longer present.

In order to prevent transient signals from being applied to the galvanometer when the electrodes are being changed or positioned on the patient, the switches 82, 84, 134 and 136, which advantageously are ganged so that they may be operated by means of a single control lever (not shown), are closed. This grounds the control grid circuits and prevents the inter-stage coupling condensers from being charged by the transient voltages. With this arrangement, rapid stabilization of the circuit, after changing or connecting to different electrodes, is obtained.

The ballast tube 38 compensates for changes in line voltage in two ways. It can be seen from the circuit diagram that the voltage delivered by the bridge rectifier 40 is divided into two portions, one of which is applied to heaters 34 and 36 of the amplifier input tubes 20 and 22, and the other portion, which is developed across the ballast tube 38, is connected as operating bias for the bridge-amplifier tubes 130 and 132. This circuit may be traced from the ungrounded end of ballast tube 38 through the sliding contact 140 and potentiometer 138 to the potentiometers 118 and 120 the sliding contacts 122 and 124 of which are connected, respectively, to the control grids 126 and 128 of tubes 130 and 132. In operation, if the line voltage increases, the voltage delivered by the bridge rectifier 40 increases, which, in turn, tends to increase the current through ballast tube 38. This change in current through the ballast tube causes the resistance of the ballast tube to increase and thus prevents a corresponding increase in the current through heaters 34 and 36, and results in increased voltage drop across ballast tube 38. The increased voltage developed across ballast 38 is in turn applied as negative bias to the tubes 130 and 132, thus tending to reduce the sensitivity of the recording system by an amount sufficient to compensate for the increased line voltage. If the line voltage decreases, the reverse effect takes place and the current through heaters 34 and 36 is maintained substantially constant while the voltage appearing across ballast tube 38 decreases slightly thus increasing the sensitivity of the recording system and compensating for the drop in line voltage. With this arrangement, the normal variations in line voltage do not significantly affect the accuracy of the instrument. In addition, the general arrangement wherein a bridge circuit is employed in the output circuit, which tends to compensate automatically for ordinary line voltage variations, further increases the stability of the system. This effect is aided by the presence of ballast tube 154, which provides increased resistance when the total current through the bridge circuit increases, thus tending to maintain more nearly constant current in the bridge circuit.

It is thus seen that in accordance with the present invention, an improved recording and control arrangement has been provided and reliable operation insured. It is furthermore apparent that the example given herein is for the purpose of illustration and is not intended to be exhaustive, but it is intended to be modified, as may be desirable in best suiting it to a particular use, and that the scope of this invention is to be measured by the following claims. It is furthermore apparent that, for particular applications, one or more of the features of this invention can be used to advantage without a corresponding use of other features.

Although the above-described embodiment of the invention includes electron tubes, it is to be understood that other commercially available devices, which when substituted would perform the same or similar functions, may be substituted therefore in particular applications. For example, in one or more places the electron tubes can be replaced with transistors, or other semi-conductive elements, provided the circuit changes necessitated by the different impedance, voltage, or other characteristics are made.

I claim:

1. In an electrocardiograph or the like, the combination comprising an electronic amplification circuit having input and output terminals, a power supply connected to apply operating potential to said amplification circuit, a recording galvanometer connected to said output terminals, and an overload protection circuit for preventing damage to said recording galvanometer such as would be caused by signals of excessive magnitude, said overload protection circuit including at least one gaseous discharge tube, and means under the control of said discharge tube arranged to render said amplification circuit inoperative whenever said signals exceed a predetermined maximum value.

2. In an electrocardiograph or the like, an electronic amplification circuit having input and output terminals, a power supply connected to apply operating potential to said amplification circuit, a recording galvanometer connected to said output terminals, and an overload protection circuit for protecting said galvanometer against damage which would be caused by receipt of a signal of excessive magnitude including at least one electron discharge tube, and a voltage-dropping resistor connected to said power supply in series with said tube and connected to said amplification circuit and arranged to reduce the voltage supplied to said amplification circuit upon receipt of said excessive signal.

3. The arrangement as claimed in claim 2 wherein said electron tube is a gaseous type electron discharge tube.

4. In an electrocardiograph or the like, the combination comprising an electronic amplifier having input and output terminals, a bridge circuit having control and unbalance terminals, said control terminals being coupled to said amplifier output terminals, a recording galvanometer connected to said unbalance terminals of the bridge circuit, and an overload protection circuit for preventing damage to said recording galvanometer such as would be caused by signals of excessive magnitude, said overload protection circuit including at least one gaseous discharge tube coupled to said amplifier, means under the control of said tube and adapted to be energized by ignition thereof for rendering said electrocardiograph inoperative whenever said signals exceed a predetermined maximum value, and relay means responsive to ignition of said tube for extinguishing said tube.

5. In an electrocardiograph or the like, the combination comprising an electronic amplifier having input and output terminals, said output terminals delivering signals of opposing polarities, a bridge circuit having energizing, control, and unbalance terminals, said control terminals being coupled to said amplifier output terminals, a recording galvanometer connected to said unbalance terminals of the bridge circuit for recording said signals, and an overload protection circuit, for preventing damage to said recording galvanometer such as would be caused by signals of excessive magnitude, said overload protection circuit including first and second gaseous discharge tubes having first and second control electrodes, respectively, coupled to said control terminals of said bridge, voltage-reducing means under the control of said tubes and adapted to render said bridge circuit inoperative whenever either of said tubes is ignited by the presence of an excessive signal voltage at said control terminals, and a relay under control of the ignited one of said tubes arranged to extinguish it a predetermined interval after its ignition.

6. An overload protection circuit for automatically protecting electrical apparatus from damage that would be caused by the application of excessive voltage thereto, said circuit comprising a push-pull amplifier having first and second signal output terminals of opposing polarities, first and second gaseous discharge tubes each having a cathode, an anode, and a control electrode, a coupling circuit connecting said first and second output terminals, respectively, to said control electrodes of said first and second tubes, a relay under the control of said tubes and adapted to be energized by the ignition of either of said tubes, means independent of the operation of said relay and under the control of said tubes for preventing the application of said signals to said apparatus whenever either of said tubes is energized, and second means under the control of said relay for de-energizing said gaseous discharge tubes.

7. In a direct-recording electrocardiograph or the like, apparatus for controlling the center position of the recording means, said apparatus comprising a push-pull electronic amplifier having first and second signal output terminals, a bridge circuit coupled to said output terminals and including first and second electron discharge devices, a source of bias voltage for said first and second discharge tubes, and common control means for adjusting simultaneously and in opposite directions the relative bias voltages applied to said tubes, thereby to control the balance point of said bridge and adjust the position assumed by said recording device when no deflecting voltage is applied thereto.

8. In an electrocardiograph, apparatus for controlling the center position of the recording means, said apparatus comprising a push-pull electronic amplifier having signal output terminals and first and second amplifier tubes each having an anode, first and second coupling condensers for coupling signal voltages from said anodes to the respective output terminals, a bridge circuit coupled to said output terminals and including first and second electron discharge devices, a source of bias voltage for said first and second discharge tubes, and control means for adjusting the relative bias voltages applied to said tubes, and voltage adjusting means responsive to adjustment of said control means for simultaneously varying the voltages applied to said anodes in the same direction and by the same amount as the bias voltages, whereby the potential difference appearing across said coupling condensers remains constant during adjustment of said control means, thereby preventing drifting of said center position of said recording device.

9. In an electrocardiograph, or the like, apparatus for controlling the center position of the recording means, said apparatus comprising an amplifier having a signal output terminal and an amplifier tube with an anode a source of voltage coupled to said anode, a coupling condenser for coupling signal voltages from said anode to said output terminal, an indicator circuit coupled to said output terminal and including a second amplifier tube, a source of bias voltage for said second amplifier tube, a potentiometer for varying the bias voltage applied to said second tube, and means under control of said potentiometer for varying the voltage applied to said anode in the same direction and by the same amount as said bias voltage so as to maintain the D. C. voltage across said coupling condenser substantially constant.

10. In an electrocardiograph, or the like, apparatus for controlling the center position of the recording means, said apparatus comprising a push-pull electronic amplifier having signal output terminals and first and second amplifier tubes each having an anode, first and second coupling condensers for coupling signal voltages from said anodes to the respective output terminals, a bridge circuit coupled to said output terminals and including first and second electron discharge devices, a source of bias voltage for said first and second discharge tubes, a first potentiometer for oppositely varying the bias voltages applied to said tubes, a second potentiometer for oppositely varying the voltages applied to said anodes, and means for simultaneously adjusting said potentiometers.

11. In an electrocardiograph, or the like, a system for compensating changes in supply voltage comprising a voltage source, an electron amplifier having first and second electron discharge tubes each having a heater and a control electrode, a voltage source, a first voltage-supply circuit connected to said source for providing current for the heater of said first tube and including a resistance element having a positive coefficient of resistance connected in series therewith, a second voltage-supply circuit connected to said control electrode of said second tube, and means connecting the voltage produced across said resistance to said second circuit, whereby the gain of said amplifier is maintained substantially constant irrespective of limited changes in the voltage delivered by said source.

12. In an electrocardiograph having electronic amplification and wherein the patient is connected to ground, apparatus for preventing accidental electric shock to the patient comprising an electrode connectible to a patient, and circuit means connecting said electrode to ground including a fuse and a reactive element arranged to prevent harmless instantaneous electrical surges from blowing said fuse.

13. Apparatus as claimed in claim 12 wherein said reactive element is a condenser connected in parallel with said fuse.

HOWARD N. FAWCETT.

References Cited in the file of this patent

UNITED STATES PATENTS

| Number | Name | Date |
| --- | --- | --- |
| 1,647,710 | Nichols | Nov. 1, 1927 |
| 1,816,465 | Boas et al. | July 28, 1931 |
| 1,829,267 | Duchosal | Oct. 27, 1931 |
| 1,924,469 | Strecker | Aug. 29, 1933 |
| 2,085,488 | Woodward et al. | June 29, 1937 |
| 2,103,366 | Higgins | Dec. 28, 1937 |
| 2,106,287 | Swart | Jan. 25, 1938 |
| 2,200,233 | Whitehead | May 7, 1940 |
| 2,262,936 | Hollmann | Nov. 18, 1941 |
| 2,310,342 | Artzt | Feb. 9, 1943 |
| 2,329,073 | Mitchell | Sept. 7, 1943 |
| 2,347,714 | Sorensen | May 2, 1944 |
| 2,394,084 | Livingston | Feb. 5, 1946 |
| 2,419,682 | Guillemin | Apr. 29, 1947 |
| 2,451,953 | Ingram | Oct. 19, 1948 |
| 2,457,131 | Curtis | Dec. 28, 1948 |
| 2,464,848 | Collins | Mar. 22, 1949 |
| 2,490,167 | Storm | Dec. 6, 1949 |
| 2,497,918 | Taylor | Feb. 21, 1950 |
| 2,504,699 | Kluender | Apr. 18, 1950 |
| 2,531,458 | Nye | Nov. 28, 1950 |